(12) United States Patent
Haselden et al.

(10) Patent No.: US 7,634,687 B2
(45) Date of Patent: Dec. 15, 2009

(54) CHECKPOINT RESTART SYSTEM AND METHOD

(75) Inventors: James Kirk Haselden, Sammamish, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 11/035,257

(22) Filed: Jan. 13, 2005

(65) Prior Publication Data

US 2006/0156157 A1 Jul. 13, 2006

(51) Int. Cl.
*G06F 11/00* (2006.01)
(52) U.S. Cl. .............................. 714/15; 714/20; 706/25
(58) Field of Classification Search ............... 714/15, 714/20; 706/25
See application file for complete search history.

(56) References Cited

U.S. PATENT DOCUMENTS

| | | | | |
|---|---|---|---|---|
| 4,878,167 A | * | 10/1989 | Kapulka et al. | 714/16 |
| 5,301,309 A | * | 4/1994 | Sugano | 714/12 |
| 5,887,274 A | * | 3/1999 | Barry et al. | 707/202 |
| 6,216,237 B1 | * | 4/2001 | Klemm et al. | 714/38 |
| 6,393,583 B1 | * | 5/2002 | Meth et al. | 714/12 |
| 6,981,243 B1 | * | 12/2005 | Browning et al. | 717/124 |
| 7,085,955 B2 | * | 8/2006 | Prabhu | 714/6 |
| 2006/0168473 A1 | * | 7/2006 | Sahoo et al. | 714/15 |

* cited by examiner

*Primary Examiner*—Emerson C Puente
(74) *Attorney, Agent, or Firm*—Workman Nydegger

(57) ABSTRACT

The subject invention pertains to a systems and methods of restarting programs upon failure. In particular, the systems and methods provide for generation of a checkpoint component including program execution status or completion data as well as state. This checkpoint component can then be employed by an execution engine to restart the program at a point in time captured by the checkpoint component. According to one specific aspect of the invention, these systems and methods can be applied to a workflow system to facilitate restarting a workflow package or process described thereby.

20 Claims, 16 Drawing Sheets

CHECKPOINT RESTART SYSTEM AND METHOD

TECHNICAL FIELD

The subject invention relates generally to software failure recovery systems and methods and more particularly toward automated workflow technologies.

BACKGROUND

Computer programs have been known to fail or crash from time to time despite extensive preventative measures. This is not a recent development as most every computer user has likely experienced program failure in some form at an inopportune time. Programs can fail for a myriad of different reasons. For example, programs may prematurely fail if they violate memory access conditions, if they contain bad pointers, or due to the unavailability of referenced data stores or other computer devices. Furthermore, programs can simply crash due to logic failures introduced by a programmer during coding. Upon failure, conventional programs inform the user of the failure and terminate the application. In some cases, the memory contents prior to the failure will be provided to a user to be used in determining the cause of the failure. Additionally, the user may be given the opportunity to provide failure information to the application vendor, which can be utilized to facilitate generation of a patch or revised code to prevent such failure in the future. In any event, the program will be terminated and must be restarted from the beginning.

Restarting a program can involve re-executing a significant amount of code. Consider a workflow application, for example. A workflow application implements some business process. The process is implemented as a series of steps that are executed sequentially. These steps can involve a plurality of tasks some of which can be lengthy in the time it takes to complete. It the application was to fail for some reason, conventionally, the application execution would need to be restarted from the beginning, namely the first instruction or task. This is costly in terms of execution time as well as efficiency. For example, a step in a workflow application could involve reading in a large amount of data from some data center, perhaps to build a data warehouse. This step alone could take hours to complete. Subsequently, a much less time consuming task could fail for some trivial reason. At this point, the workflow process application would need to be restarted from the beginning, which would again necessitate reading in data from the data center, among other things.

It should be appreciated that this problem is not exclusive to workflow applications. Workflow application as well as any other application can be programmed utilizing any one of a myriad of programming languages. Any conventional program regardless of its problem space has the potential to fail despite developers' preventative efforts. Moreover, once a program has failed, it must start again anew from the beginning, if it is to be re-executed.

Many recovery techniques have been developed and employed to mitigate the effects of failure. For example, data can be saved or backed up often either manually or automatically. Conventional word processing programs employ this technique so that upon failure a user does not loose all their data and can resume work on a previously saved document. However, the word processing program will terminate on failure and if restarted, the program must begin execution over from the first instruction. Similarly, some computer systems provide a mechanism for restoring the system upon failure by storing copies of critical system files. These files can then be restored after failure by replacing current files with the previously saved backup files. This is often employed to facilitate recovery from a complete system failure due to accidental or malicious file deletion or corruption.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the subject invention concerns systems and methods of efficient program failure recovery. In particular, the invention discloses a means and mechanism for restarting computer program execution at or substantially close to a point of failure rather than from the beginning as is conventionally done. In accordance with an aspect of the subject invention, an execution engine is provided which receives a program component, executes the program, generates one or more checkpoint components, and stores the one or more checkpoint components to non-volatile memory. The checkpoint component can include completion data specifying execution status such as the last successfully executed instruction or instruction set. Furthermore, the checkpoint component can include program state data that saves the current state of program variables and data structures, for example, at the time of checkpoint creation. If the program executes to finish, the checkpoint components can simply be deleted. However, if there is a failure, the execution engine can retrieve the checkpoint component and utilize the data stored therein to restore programmatic state and determine the point at which execution should be restarted.

According to aspect of the invention, the program can include parameters, properties or instructions that control execution engine action with respect to checkpoint components and generation thereof. For example, the parameters can specify, among other things, if a checkpoint is to be generated, how many checkpoints are generated, when they are to be generated, where the checkpoint component is to be saved, and if the checkpoint is to be employed to restart the program.

According to other aspect of the invention, the execution engine can employ diagnostic and/or correction components. The diagnostic component can analyzed the program using various mechanisms to determine the cause of a program failure. Subsequently, a user can be notified and provided an opportunity to fix the identified problem. Additionally or alternatively, a correction component can be employed to apply corrective action. This action can be a one-time fix or alternatively the correction component can modify the program for a more permanent solution.

A checkpoint generation component is also provided, in accordance with an aspect of the invention. The checkpoint generation component generates checkpoint component at particular times during execution. Accordingly, a monitor component can be employed to monitor execution of the program and facilitate generation of checkpoints at particular points during execution. In accordance with another aspect of the invention, the generation component can employ an intelligent assist component that can be utilized to infer and/or predict failure of an instruction or set thereof. Based on information provided by the intelligent assist component, the generation component can determine whether to generate a checkpoint.

In accordance with yet another aspect of the invention, the disclosed system can be employed to improve failure recovery with respect to workflow systems and programs. Hence, similar to the described execution engine, a workflow engine can be employed to execute workflow packages and generate checkpoint components associated therewith. The checkpoint component can include both completion data and container state data. The completion data can include container identification, execution results, and precedent constraint data. The state data can include container identification and variable data including variable identification and values.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
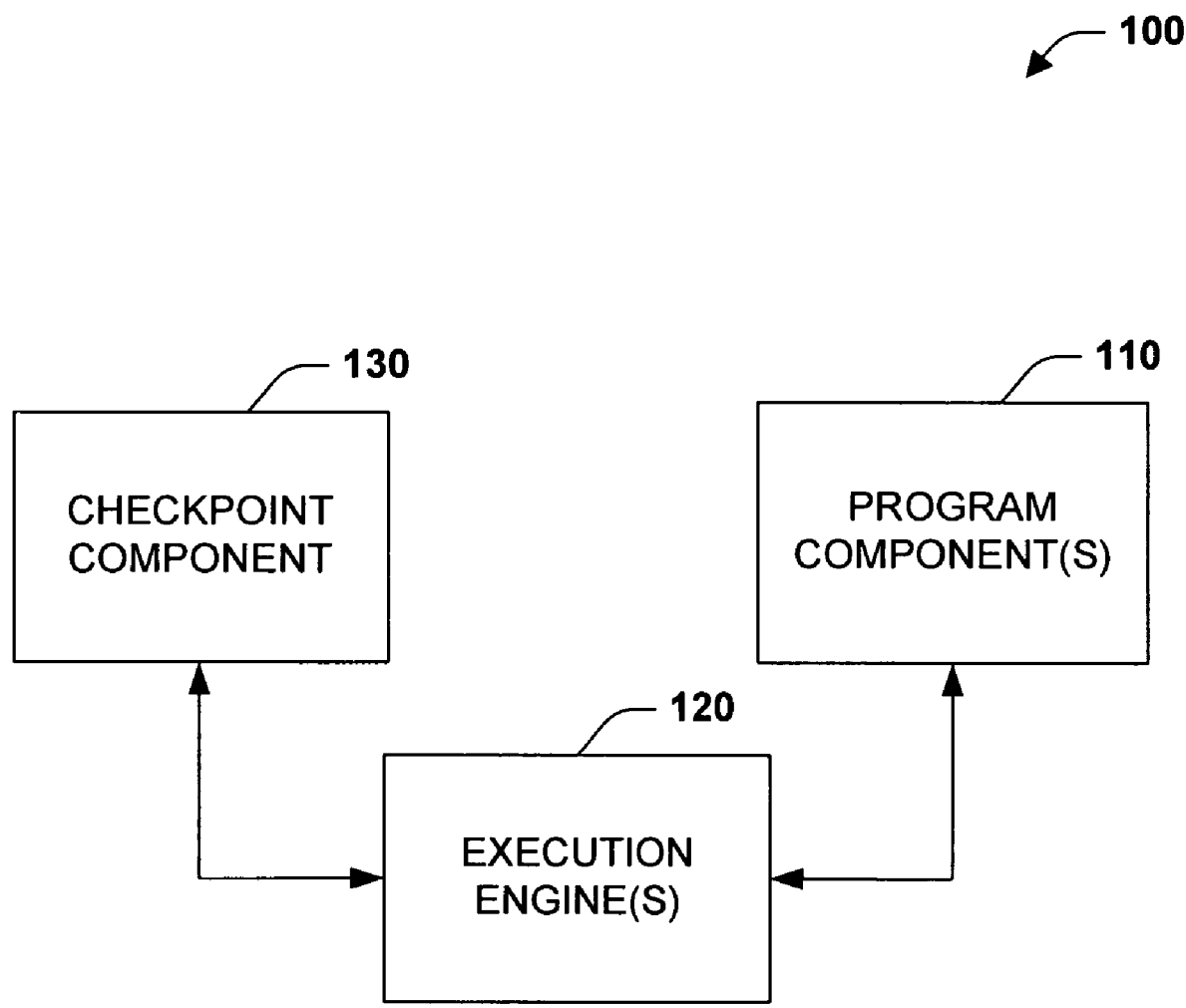
FIG. 1 is a block diagram of a restart system in accordance with an aspect of the subject invention.

The present invention is now described with reference to the annexed drawings. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system," "engine" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a server and the server can be a component. One or more components may reside within a process and/or thread of execution and a component may be localized on one computer and/or distributed between two or more computers. Furthermore, while system functionality is described with respect to a plurality of components, it should be appreciated that the subject invention is not limited to the division of functionality provided by individual components as the functionality provided thereby can be combined and provided by a more comprehensive component or divided amongst several more specific components.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Artificial intelligence based systems (e.g., explicitly and/or implicitly trained classifiers) can be employed in connection with performing inference and/or probabilistic determinations and/or statistical-based determinations as in accordance with one or more components or systems of the invention, which are described in further detail later. As used herein, the terms "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring initially to FIG. 1, a restart system 100 is illustrated in accordance with an aspect of the subject invention. Restart system 100 includes a program component 110, an execution engine 120 and a checkpoint component 130. Program component 110 can include one or more instructions or execution units as well as programmatic constructs (e.g., variables, objects, components . . . ) that together specify computer behavior. For example, a program component 110 can cause a computer to receive input, perform some logic and/or comparisons, and produce an output. Program component 110 can correspond to any type of program including but not limited to one or both of system software and application software. System software includes software that is employed to manage computer and/or network devices and resources. Accordingly, system software can include but is not limited to an operating system, a compiler, and computer utilities like a disk defragmenter or debugger. Application software operates at a higher level, executes tasks, and performs services that are useful or entertaining to an end user. For instance, application software can include but is not limited to word processing system, spreadsheets, games, media players, enterprise resource planning (ERP) systems, workflow systems (described in more detail infra.) and the like. The execution engine 120 can execute instructions provided by the program component 110.

Execution engine 120, among other things, executes instructions and generates one or more checkpoint components 130. In particular, the execution engine 120 retrieves instructions from the program component 110, interprets the instructions and executes the instructions. During execution, execution engine 120 can generate checkpoint components 130. Checkpoint components 130 provide information or data concerning the execution of a program at a particular point such as the time of checkpoint creation. Upon creation of a checkpoint component 130, the execution engine 120 can store the checkpoint component 130 to a non-volatile storage medium. For instance, a checkpoint component 130 can be written to one or more computer readable mediums, for example as part of a hard drive, a server, or the like. Thereafter, if execution of the program component 110 fails, for example due to a hard, soft, or logic error, the checkpoint component 130 can be employed by the execution engine 120 to facilitate restart of the program. The subject system 100, therefore, enables program execution to resume from a point close to the failure rather than starting execution over anew from the beginning. In particular, the execution engine 120 can query checkpoint component 130 for completion data and program state at the time of checkpoint creation prior to failure. The execution engine 120 can then restore this state and resume execution after the last successfully executed instruction.

It should be appreciated that program component 110 can also, according to an aspect of the invention, dictate details of the restart operation. The program component 110 can include one or more parameters, properties or instructions that can control the way execution engine 120 utilizes checkpoint components 130, if at all. For instance, properties or instructions can include but are not limited to the location where the checkpoint component 130 is stored, whether or not a checkpoint component 130 should be employed during a restart, which checkpoint component 130 should be utilized, and whether and/or how checkpoints components 130 are generated by the execution component 120. While these parameters or instructions can be embedded with the program component 110, it should also be noted and appreciated that these parameters can be specified and stored outside the program component 110, for example in some global location accessible by the execution engine 120.

Figure 2:
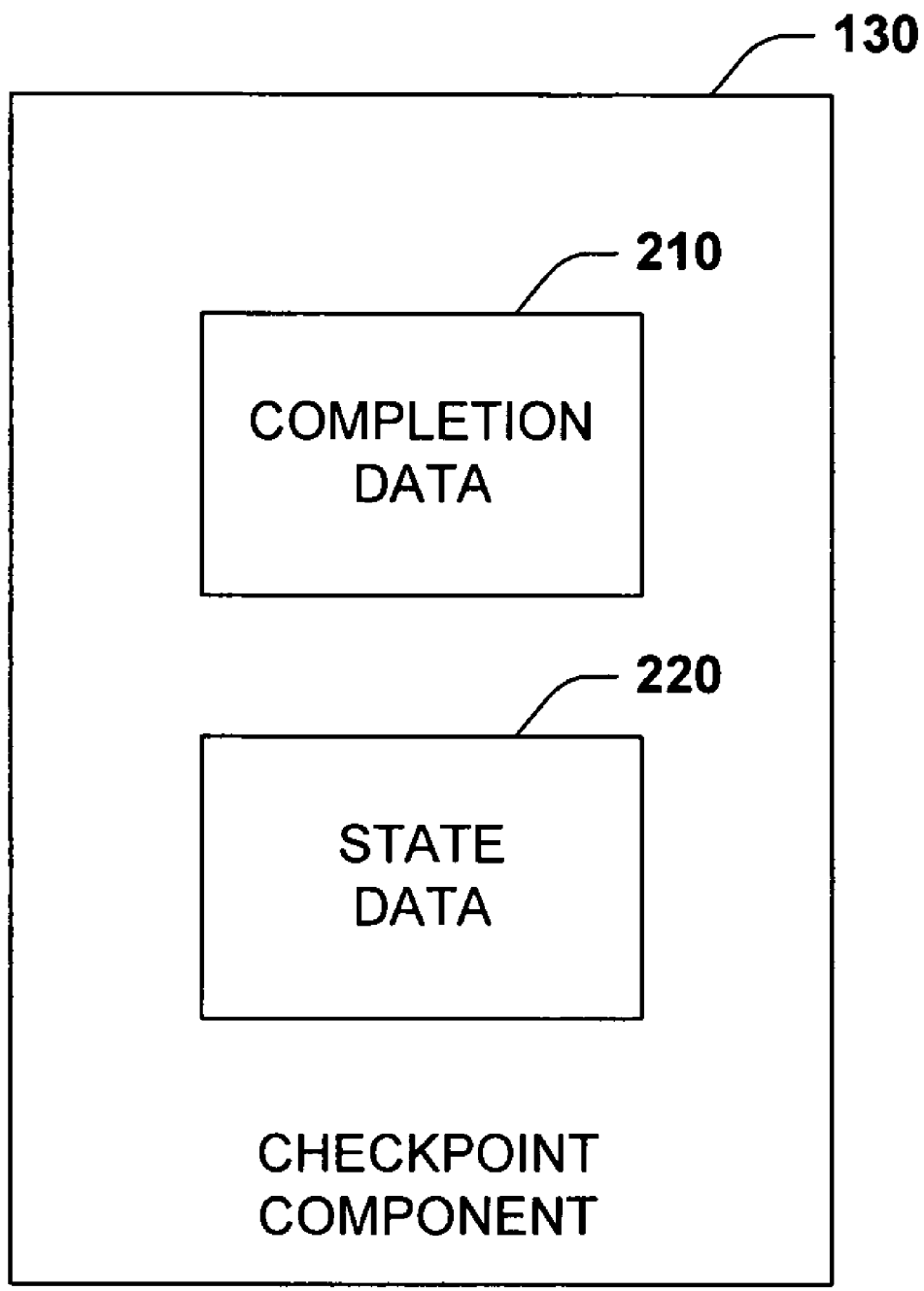
FIG. 2 is a block diagram of a checkpoint component in accordance with an aspect of the subject invention.

FIG. 2 depicts a checkpoint component 130 in further detail in accordance with an aspect of the invention. As illustrated, checkpoint component 130 can include completion data 210 and state data 220. Completion data 210 identifies completed instructions or transactions. This allows the execution engine 120 (FIG. 1) to determine a starting point on restart. State data 220, as the name suggests, provides information about program state, for example variable or data structure (e.g., lists, arrays, records, tables . . . ) values. When a program component first begins execution variables can initialized, for example "counter=0." Each subsequent instruction performs some operation and often alters one or more states. Accordingly, variable values can be modified and data structure instances such as records or tables can be populated. State data 220 captures all program states at the time of checkpoint creation. Together completion data 210 and state data 220 define a point in time from which execution can be restarted. Checkpoint component 130 can be stored in a non-volatile memory source to ensure successful retrieval upon failure. Furthermore, checkpoint component 130 can be stored in non-volatile memory in any number of formats including but not limited to a text file, a record, and XML document.

Figure 3:
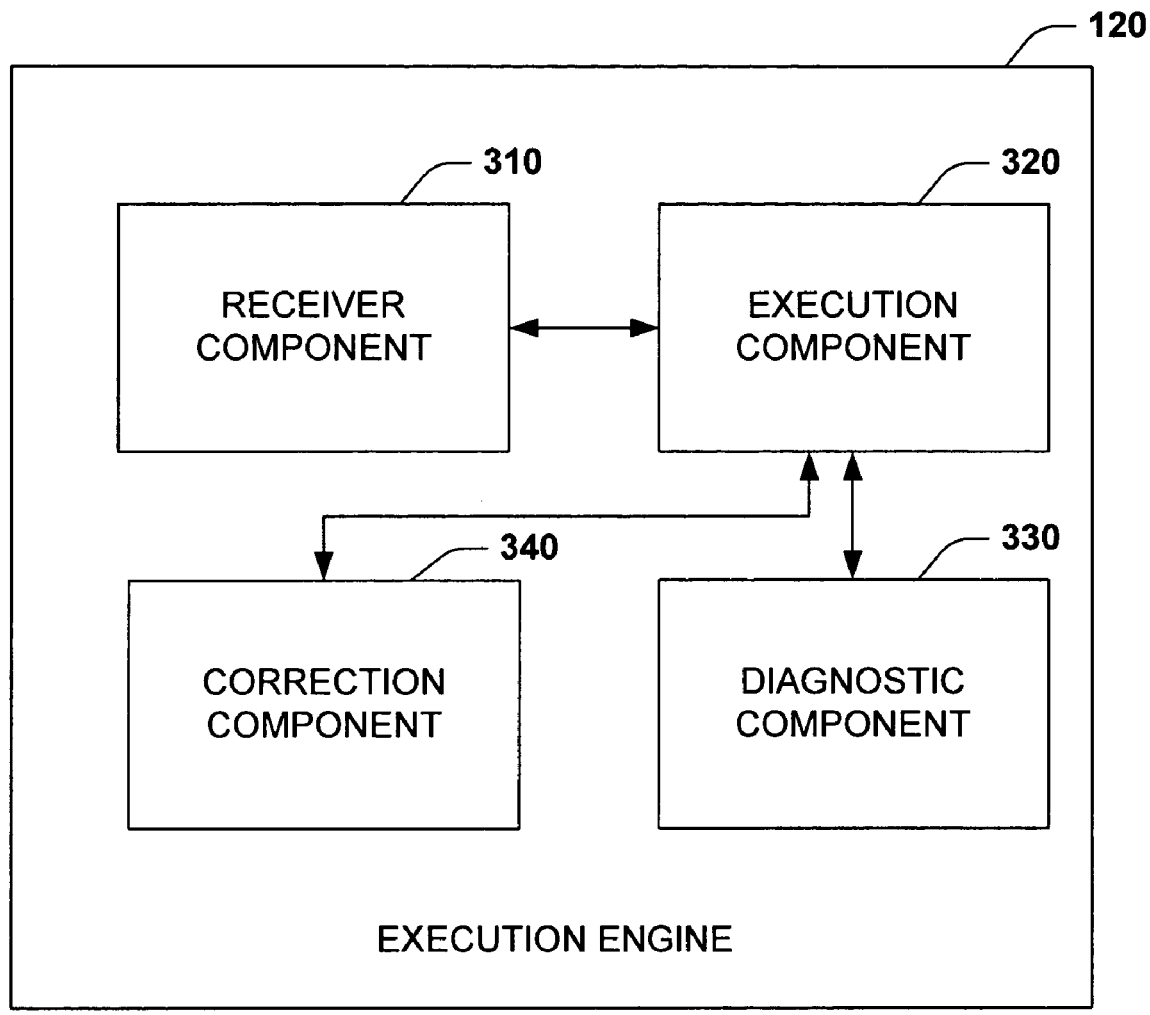
FIG. 3 is a block diagram of an execution engine in accordance with an aspect of the subject invention.

FIG. 3 depicts an execution engine 120 in accordance with an aspect of the subject invention. Execution engine 120 can include a receiver component 310. Receiver component 310 can receive or retrieve data requested by the requested by the execution component 320. In accordance with one aspect of the invention, the receiver component can retrieve all or part of a program component 110 (FIG. 1). Additionally or alternatively, the receiver component 310 can retrieve parameters, properties or instructions from a program component 110 or an alternate source regarding checkpoint creation and usage. The receiver component can also facilitate retrieval or receipt of any input data from one or more data sources. Execution component 320 can, inter alia, request data (e.g., via receiver component 310), execute instructions, and otherwise manipulate data, for example by employing the services of a microprocessor.

The execution engine 120 can also include a diagnostic component 330. Upon program execution failure, diagnostic component 330 can diagnose the cause of the failure. This can be accomplished my any number of conventional means of identifying errors. Additionally or alternatively, the diagnostic component 330 can employ knowledge based or artificial intelligence (e.g., Bayesian networks, classifiers, neural networks, decision trees or graphs, fuzzy logic, expert systems, vector machines, Hidden Markov Models, regression, probabilistic/statistical analysis . . . ) to facilitate diagnosis. Upon error identification, diagnostic component 330 can provide notification (e.g., pop-up message box) to the user of the particular error or evidence thereof (e.g. memory dump).

Additionally or alternatively, corrective component 340 can be employed identify a one or more potential corrective actions. Similar to the diagnosis component 330 corrective action component 340 can employ any number of means to identify corrective action. Such corrective actions for particular errors can be hard coded such that they can easily be looked up, for instance. Furthermore, knowledge based systems or other form of artificial intelligence can be employed. Once a corrective action is identified, it can be provided to the user in conjunction with the error notification. In this way, users can be empowered to repair the problem in a manner they feel is most appropriate. Alternatively, corrective action can be applied automatically by the correction component 340 alone or in conjunction with one or more other components such as the execution component 320. Furthermore, it should be appreciated that this can be a one-time fix or a permanent fix. For example, the corrective action includes clearing a table's contents this can simply be done. Alternatively, correction component 340 can modify the program component such that this is done prior to writing to the table, for instance. After corrective action is taken (if taken at all), program component execution can be restarted via execution component 320.

Figure 4:
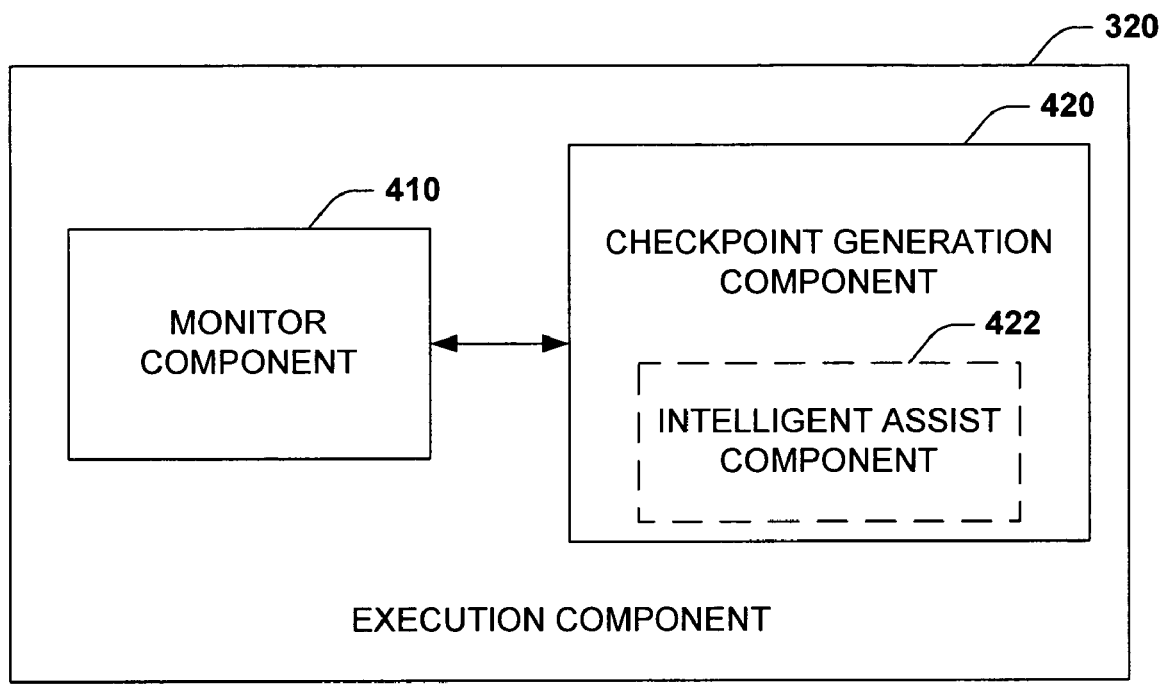
FIG. 4 is a block diagram of an execution component in accordance with an aspect of the subject invention.

Referring to FIG. 4, an execution component 320 is illustrated in accordance with an aspect of the invention. Execution component 320 can include a monitor component 410 and a checkpoint generation component 420. Monitor component 410 monitors or observes program execution. Monitor component 410 is communicatively coupled to checkpoint generation component 420. Checkpoint generation component 420 can generate one or more checkpoint components 130 (FIG. 1). Checkpoint generation component 420 can simply generate checkpoint components 130 at predetermined times. However, checkpoint generation component 420 can also cooperate with monitor component 410 such that checkpoint components 130 can be generated during and based on program execution. For example, checkpoints can be generated after successful execution of particular instructions, such as those contained within the main( ) class of an object oriented language (e.g., C#, Java . . . ). Furthermore, more intelligent checkpoint component generation is also contemplated and within the scope of the subject invention.

By way of example, checkpoint generation component 420 can include an intelligent assist component 422. The intelligent assist component 422 can be employed to infer or predict possible sources of execution failures. The intelligent assist component 422 in conjunction with monitor component 410 can analyzed program instructions and provide a value indicative of a degree of confidence or likelihood that a particular instruction or set of instructions will succeed or fail. For example, a simple computation or variable assignment would probably have a low likelihood of failure while an instruction to write and/or read to or from a data source could have a higher likelihood of failure as the source could not be available (e.g., not created, deleted, off line . . . ) or could contain corrupt data. The confidence value can then be utilized by the checkpoint generation component 420 to determine when or even if a checkpoint component should be generated. For instance, checkpoint generation component 420 could receive a confidence value from intelligent assist component 422, compare the value to a threshold, and based on that comparison determine whether or not to generate a checkpoint component prior to execution of the instruction. Furthermore, it should be noted that intelligent assist component 422 could employ knowledge based and/or intelligent systems (e.g., Bayesian networks, classifiers, neural networks, decision trees or graphs, fuzzy logic, expert systems, vector machines, Hidden Markov Models, regression, probabilistic/statistical analysis . . . ) to perform inferences concerning the susceptibility of program execution to failure. In this manner, machine-learning techniques can be utilized to adjust confidence values, for instance, based on previous program or instruction executions. It should be appreciated that these more advanced mechanisms for determining when and if a checkpoint component should be generated can be applied alone or in conjunction with more simple means such as producing a checkpoint component after each successful execution of an instruction or set of instructions.

There are a myriad of different ways that checkpoint components 130 (FIG. 1) can be utilized to restart a program component 110 (FIG. 1). Returning briefly to FIG. 3, receiver component 310 can be employed to receive instructions or parameters specified in the program or other location. Additionally, instructions pertaining to how checkpoint components are handled can be received or retrieved from any other location by receiver component 310. For instance, these instructions can specify if and/or which checkpoint component should be used during restart. Ideally, one would like to restart from the time closest to but not including the failure. Thus, this could be specified so that upon failure and restart, the program would automatically restart from the last generated checkpoint component. Alternatively, the execution component 320 could query the user to select a checkpoint for instance via a pop-up box or window or any other user interface. There will be times when the program component executes successfully without failure. In such cases, received parameters or instructions can provide answers as to what to do with the generated checkpoint components such as deleting them and/or saving them, perhaps to a different location.

Although the system described supra can be employed with respect to various types of computer programs, the following provides a description of the system with respect to a workflow application in accordance with a particular aspect of the invention. In general, workflow applications or systems are concerned with automating business or organizational processes. Workflow designers generally divide a business process into discrete units that are performed and monitored for some result. The workflow can include tasks or procedures, involved individuals, and required input and output. Typically, workflow software is written in a high-level procedural language. A workflow system is often provided as an abstraction above conventional programming and development tools, where instead of actually specifying the program in a text editor, the program is designed as a workflow diagram. This provides designers a high-level interface where they can generate a diagram, each block corresponding to a particular step or task. A process can therefore be defined in terms of a plurality of blocks. The blocks can be connected with arrows to other blocks, which also define precedent constraints. These constraints dictate the order that blocks are to be executed. For example, a user may define an FTP task as being constrained on an execute process task. In this case, the workflow system must wait until execution of the process task is complete and then it executes the FTP task. The user-defined flow diagram can subsequently be converted into a series of steps called an execution plan. This execution plan can then be easily executed by a workflow engine.

Figure 5:
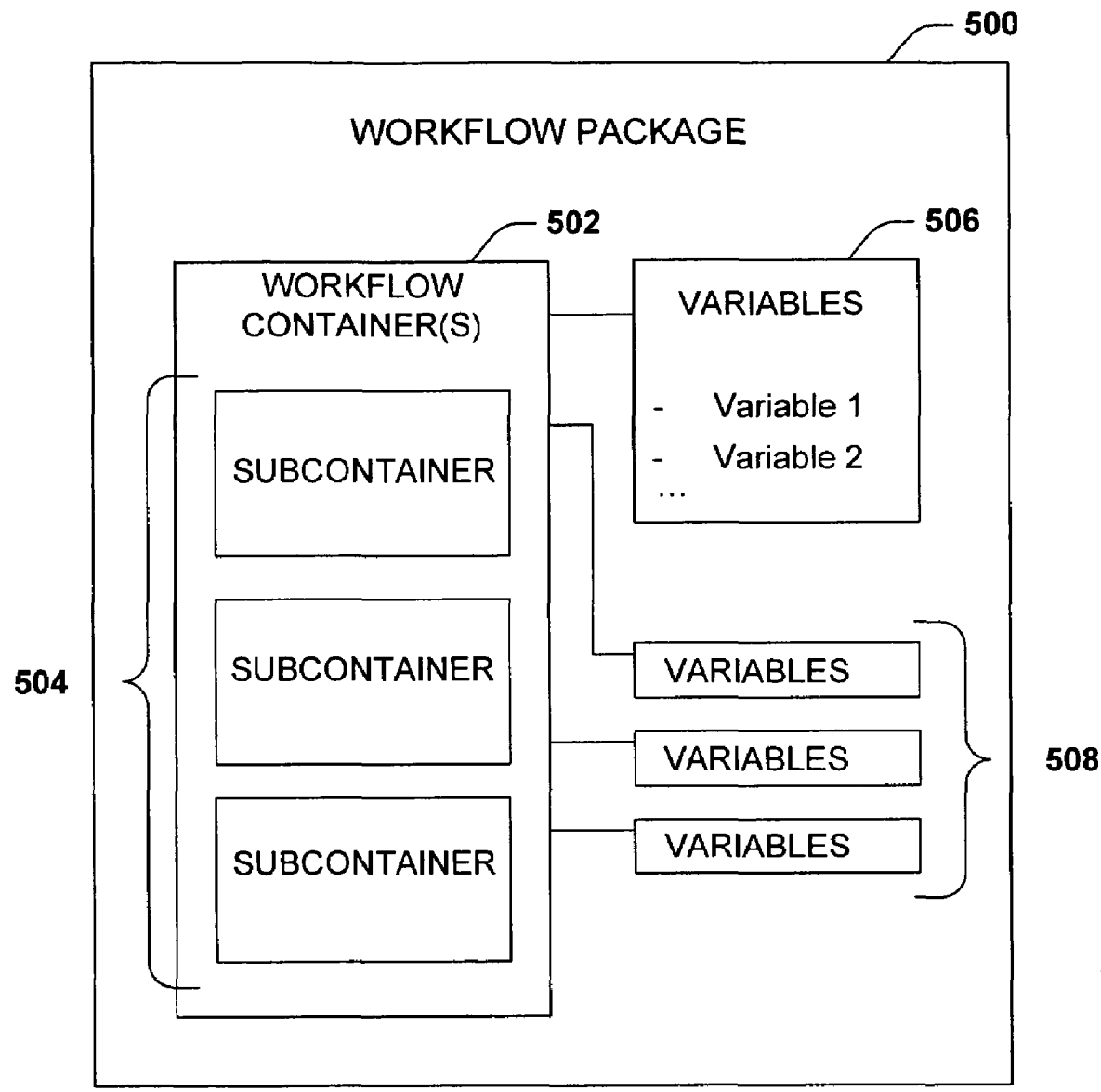
FIG. 5 is a block diagram of a workflow package in accordance with an aspect of the subject invention.

Turning to FIG. 5, a workflow package 500 is illustrated in accordance with an aspect of the invention. A workflow package 500 defines a business or organization process. Thus, the workflow package 500 can coordinate work between multiple persons working on the same project. Workflow package 500 can include one or more workflow containers 502. Workflow containers 502 are a special type of task that contains a plurality of tasks that provide workflow functionality. There can be at least two types of containers: looping and sequential. Looping containers include tasks that repeat for a period of time, whereas sequential containers contain tasks that simply execute once sequentially. Workflow containers 502 can also contain sub-containers 504 thereby defining a hierarchy of tasks. Containers 502 thus provide a grouping mechanism for tasks. Accordingly, the workflow package can also be viewed a container as it includes a plurality of tasks as well as containers including tasks. Furthermore, tasks themselves can be viewed as unique containers including only a single task.

Variables can be associated with containers. Variables can be represented simply as name value pairs. For example, variables 506 can be associated with workflow container 502 and variables 508 can be associated with the sub-containers 504. Variables provide a way for one task to influence a subsequent class. By way of example, assume there is a process to download a web server log file for the current date. There can be a task that computes the file name (e.g., written in a script language). There can also be an associated file transfer task, such as an FTP task. The first task computes the file name. For example, the file name can be computed by making a file name out of the current date such as "//myweb-server/logfiles/log12-1-04.log." The task can then place the generated file name in a variable. The following file transfer task can retrieve the file name from the variable and place it in a local directory. A third task could then read the file and put the records from the log file onto the database. Variables thus act as a conduit between tasks. Additionally, variables can be employed in conjunction with container loops. Looping containers include tasks that repeat for a period of time. Variables can be utilized to house values controlling iteration. There can be at least two types of looping containers: for loop and for-each loop. The for loop container is similar to the loop construct in conventional programming languages where there is an initialization expression, an evaluation expression, and an assignment expression. The for-each loop is similar to the for loop except instead of utilizing the evaluation expression it iterates over an entire collection of objects or items of various types.

Figure 6:
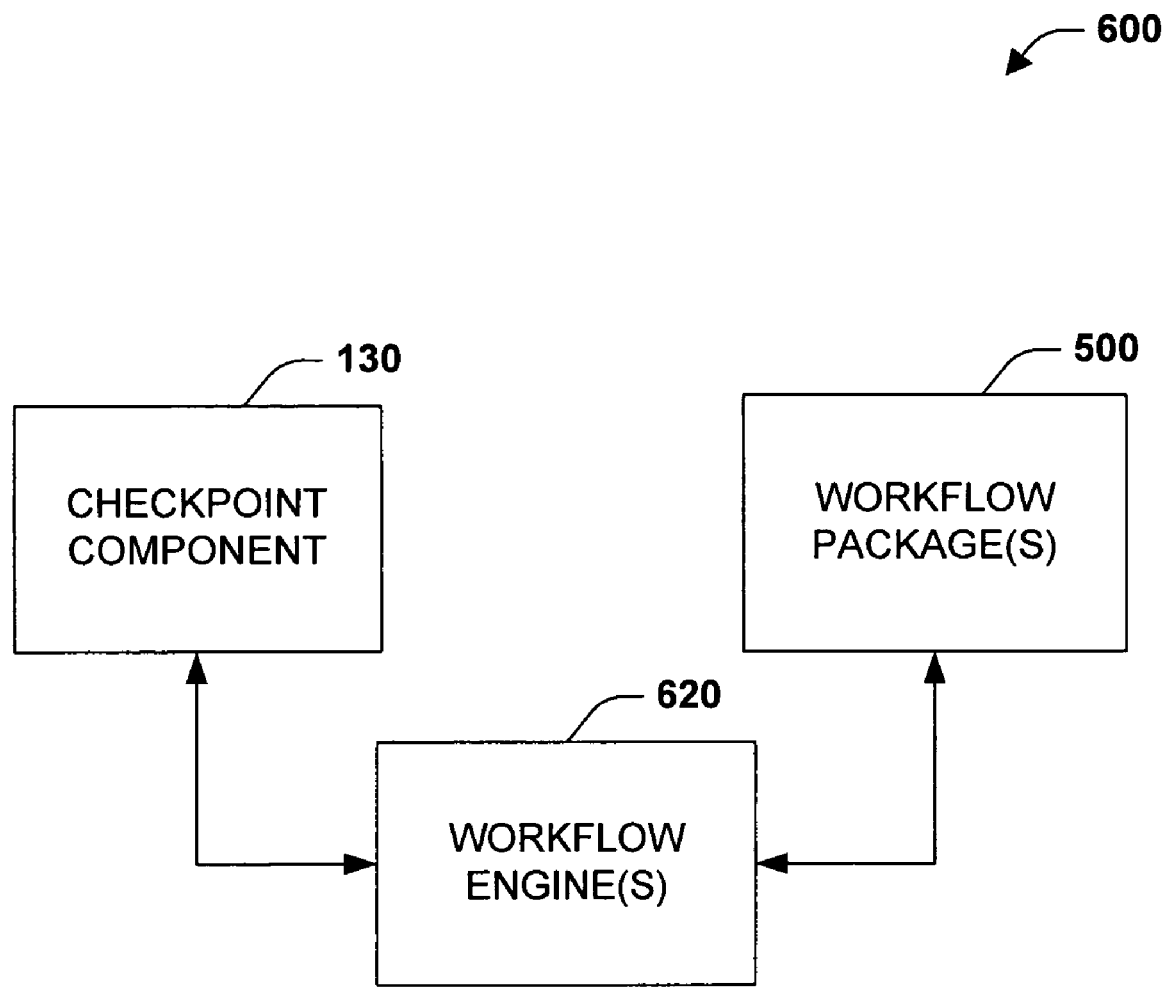
FIG. 6 is a block diagram of a workflow system in accordance with an aspect of the subject invention.

FIG. 6 depicts a workflow system 600 in accordance with an aspect of the subject invention. Similar to system 100 (FIG. 1), workflow system 600 can include workflow package(s) 500, workflow engine(s) 620, and checkpoint component 130. As described supra, workflow package(s) 500 can include one more workflow containers, sub-containers, and variables that define a business process. Furthermore, in accordance with an aspect of the invention, workflow package(s) 500 can include or be associated with checkpoint parameters, properties, or instructions (not shown). These parameters or instructions can provide specific information concerning checkpoint components 130 with respect to a particular workflow package 500. For example, properties can include but are not limited to a checkpoint file name property, a checkpoint usage property, and a save checkpoints property. The checkpoint file name property can specify or identify a location of a checkpoint component. The checkpoint usage property can specify the mode of usage of a checkpoint component at start-up such as "always," "never," or "if exists." Finally, the save checkpoints property can specify whether execution of the package must generate one or more checkpoint components. Workflow engine 620 is a component that implements, performs, and/or executes the process defined by workflow package. In accordance with an aspect of the invention, the workflow engine 620 can also generate one or more checkpoint components 130. Checkpoint component 130 provides information concerning execution status and package state, as described further below. One or more checkpoint components 130 can be produced by the workflow engine 620 periodically during execution of the workflow package 500. The checkpoint component 130 enables and facilitates restart of a package 500 upon failure thereof. Upon failure, workflow engine 620 can restart execution of the workflow package 500 from the point in time captured by the checkpoint component 130. Furthermore, it should be appreciated that workflow engine 620 can retrieve checkpoint parameters, properties, or instructions from the workflow package or some other location, and utilize such parameters to control generation, storage, and use of checkpoint components 130.

Figure 7:
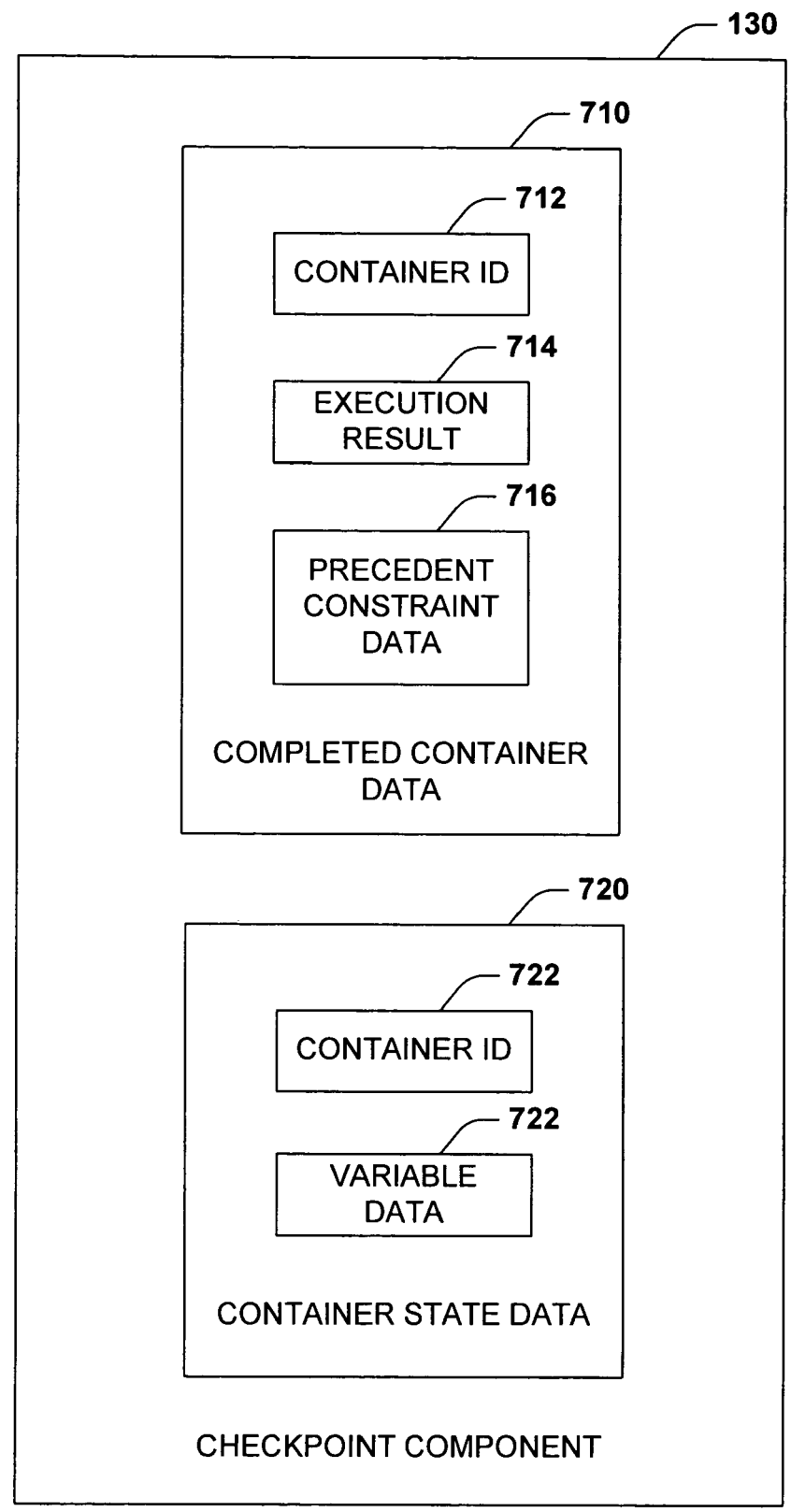
FIG. 7 is a block diagram of a checkpoint component in accordance with an aspect of the subject invention.

FIG. 7 depicts a checkpoint component 130 in accordance with an aspect of the subject invention. A checkpoint component provides a means or mechanism for continuing execution of a workflow package from the current state saved by the component. Checkpoint component 130 can include completed container data 710 and container state data 720.

Completed container data 710 stores information concerning all the containers the have been completed (e.g., in a list). This information can include container ID 712, execution result 714, and precedent constraint data 716. Container ID 712 facilitates identification of the completed container. Execution result 714 pertains to whether the completed container executed successfully or unsuccessfully. Precedent constraint data provides information concerning actions after a particular task or container completes. This data can be represented as a bitmap or set of bits each representing a single precedent constraint. There can be many types of precedent types including but not limited to a success constraint, a failure constraint, and a completion constraint. The success constraint indicates that the next task or container should execute on successfully execution of the associated task or container. Similarly, the failure constraint indicates that the next task or container should execute on failure of the associated task or container. The completion constraint loosely constrains execution of the subsequent task or container after completion of the associated task or container. Thus, the next container can execute simply upon completion regardless of success or failure. For example, task C can be specified to execute upon success of task A and failure or completion of task B.

Container state data 720 provides a snapshot of the transient state of every container. Container state data 720 can include container ID 722 and variable data 724. As mentioned previously, a workflow package can have a hierarchical structure. That is, there are containers containing other containers or other tasks. A user can create or define variables for each container, for example as simple name value pairs. These variables are visible to the container for which it is defined and all of its children. However, consider two containers A and B, for instance two loops, side by side and of the same scope where a variable X is defined for container A and variable Y is defined for container B. In this scenario, tasks or containers defined in container A will be able to see the variable X, but not variable Y. Likewise, tasks or containers defined in container B will be able to view the variable Y but not variable X. Container state data 720 captures information concerning the variables and containers at a specific point in time. Container ID provides identification of a particular container. Variable data 724 provides information such as variable ID and variable value associated with the identified container.

It should be appreciated that while the container data 710 provides information regarding only the containers that have completed, container state data 720 provides state data for all containers independent of whether they have completed or not. The rationale behind capturing the state of all containers is that even though a container task may not have completed, its state may have been modified in an essential way that needs to be captured to facilitate correct restart. Consider the variables on the workflow container itself. The package container will not complete until every container and task have completed, but these container tasks may modify the package container variables during there execution. Thus, the state of every container should be captured not just the completed containers.

To facilitate clarity in understanding several aspects of the invention the following example is provided. Assume a workflow package or process consisting of two tasks A and B, which have straightforward precedent constraints. In other words, on success of task A proceed to task B. First task A is executed by a workflow engine 620. Subsequently, a check is made based on the constraint to determine whether task A succeeded. Assuming it succeeded, the precedent constraint is satisfied. After that, assume a checkpoint component is to be generated at this point. Thus, the completed container data 710 must be populated. Here, the container ID 712 is task A (or A), the executed result 714 is "succeeded," and the precedent constraint is true. Furthermore, any state data 720 (e.g., variables) can be saved for task A and associated containers (e.g., workflow package variables). Both the completed container data 710 and the state data 730 are saved to non-volatile memory such as a disk. Next, task B is scheduled for execution, but assume execution of task B fails. Now the workflow package can be terminated leaving the checkpoint component saved to disk. At this point, a correction is made, for example, by a user upon notification or automatically by a correction component. Next, the package can be restarted. The workflow engine 620 then checks the checkpoint usage property which is set to "if exists." The engine can then utilize the checkpoint file name to locate the saved checkpoint component. The system can then proceed in one of at least two ways. First, the checkpoint component data can be loaded and execution can proceed to the next identified container or task that has not been completed, here task B. Alternatively, the engine can read in and hold in memory the checkpoint component data for reference. In this case, execution of the package will start as usual, except that it is in checkpoint mode such that the checkpoint is consulted prior to execution to determine if the task or container has been completed and the result, if completed. If the task or container has completed, there will be a record of it being completed in the complete container data 710. If the task has completed, as task A has in the present example, then the execution result will be assigned to task A without having to re-execute the task. Furthermore, any saved state will be updated in accordance with the checkpoint component. Then, the precedent constraint data associated with the completed container will be viewed and execution will proceed as if the precedent constraint actually evaluated as it is indicated in the checkpoint component precedent constraint data 716. Here, the precedent constraint is "on success," and assuming task A was successful then execution will begin with task B, which previously failed. In essence, this manner of restart is a simulated execution, where rather than executing the task or component the data values are retrieved from the checkpoint component. The effect will be that the package appears to be executed from the very point it failed.

Figure 8:
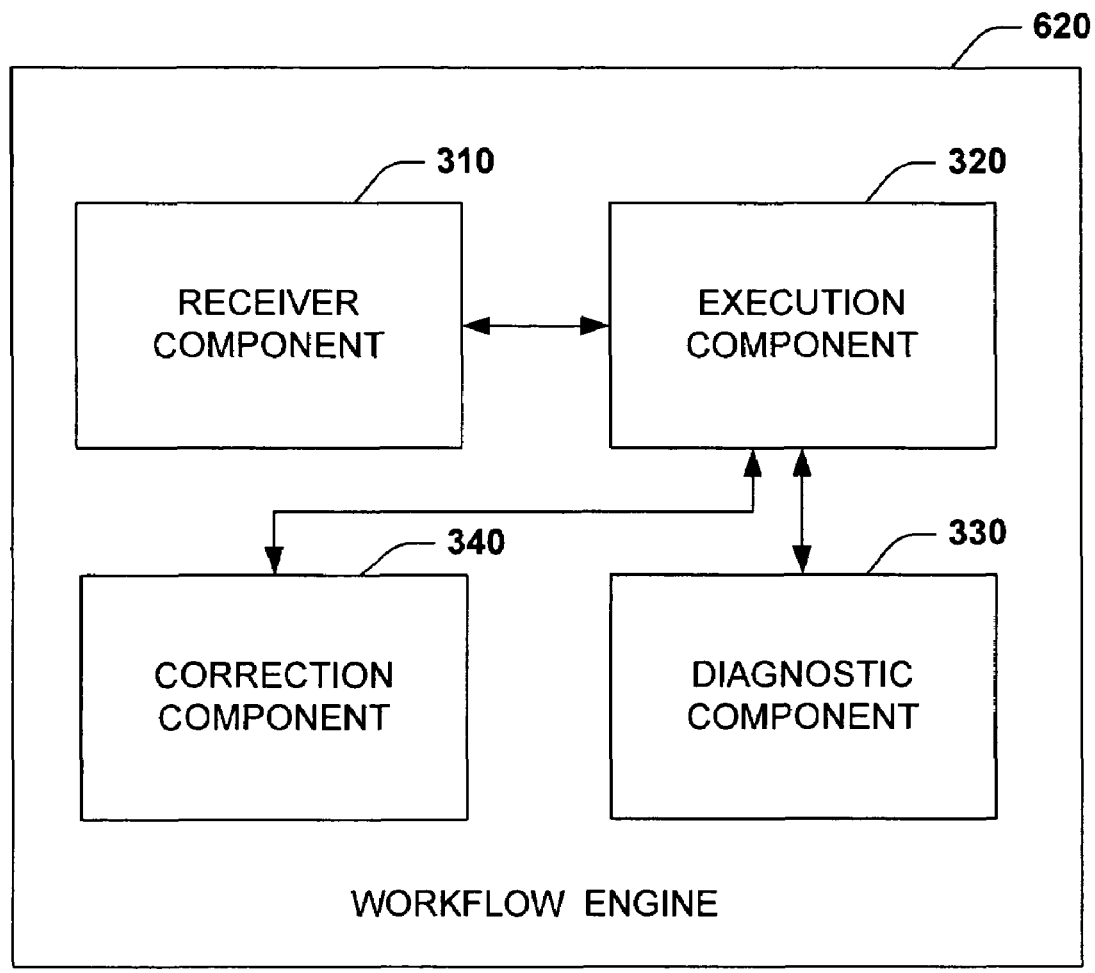
FIG. 8 is a block diagram of a workflow engine in accordance with an aspect of the subject invention.

FIG. 8 illustrates a workflow engine 620 in accordance with an aspect of the subject invention. Similar to the execution engine described with respect to FIG. 3, workflow engine 620 can include, or be communicatively coupled to, a retriever component 310, an execution component 320, a diagnostics component 330 and a corrective component 340. The retriever component 310 is capable of retrieving or receiving workflow packages including containers, tasks, and variables, as well as checkpoint component parameters from either the workflow package or elsewhere (e.g., some global location). Execution component 320 receives data from the receiver component 310 and proceeds to execute workflow tasks and containers. Furthermore, execution component 320 can generate checkpoint components 130 at particular times if and/or as specified by checkpoint parameters. Upon failure, execution component 320 can request the services of diagnostic component 330. Diagnostic component 330 determines the cause of execution failure. For example, a task may try to insert data into a table that contains data from a previous run for some reason and there is thus duplicate data or keys in the table. At this point, the execution component 320 can simply notify a user of the problem, for example, via a log or pop-up box and allow the user to make appropriate changes prior to restart. Additionally or alternatively, execution component 320 can employ corrective component 340 to make changes automatically. Corrective component 340 can utilize information provide by the diagnostic component 330 concerning the cause of the execution failure to generate a corrective action. For example, in the previous example, the corrective action can be to delete data from the table. This corrective action can be one time in nature or can be utilized to correct the workflow package, for instance, by inserting a task that clears the table prior to attempting to write to it. Furthermore, decisions such as whether or not notify the user of the failure and cause and/or to automatically correct such errors can be specified as an addition to the checkpoint properties or the like.

Returning to FIG. 4, workflow execution component 320 can include monitor component 410, checkpoint generation component 420, and intelligent assist component 422. Monitor component 410 can be employed to monitor workflow packages. Checkpoint generation component 420 generates checkpoint components. These checkpoint components can include completed container data 710 (FIG. 7) and container state data 720 (FIG. 7), among other things. Furthermore, these generated components can take various forms including but not limited to a text file, a record, an XML document and a set of interconnected objects. Checkpoint components can be generated in a variety of fashions by the checkpoint generation component 420. According to one aspect of the invention, checkpoint components can be generated after every successful task or container. Thus, monitor component 410 can be utilized to keep track of tasks or containers and assist the generation component 420 in timely generation of checkpoint components. Of course, the generation component 420 and the monitor component are able to generate checkpoint components in accordance with a predetermined or pseudo-random pattern. For example, the checkpoints can be generated after every two tasks that complete execution or every two minutes. More complex methods of checkpoint generation are also within the scope of the invention.

Checkpoint generation component 420 can include an intelligent assist component 422, in accordance with an aspect of the invention. The intelligent assist component 422 can be employed to infer or predict possible sources of execution failures. The intelligent assist component 422 in conjunction with monitor component 410 can analyzed program tasks and provide a value indicative of a degree of confidence or likelihood that a particular task or container will succeed or fail. For example, a simple computation would probably have a low likelihood of failure while an instruction to write and/or read to or from a data source could have a higher likelihood of failure as the source could not be available (e.g., not created, deleted, off line . . . ) or could contain corrupt data. The confidence value can then be utilized by the checkpoint generation component 420 to determine when or even if a checkpoint component should be generated. By way of example, checkpoint generation component 420 could receive a confidence value from intelligent assist component 422, compare the value to a threshold, and based on that comparison determine whether or not to generate a checkpoint component prior to execution of the instruction. Intelligent assist component 422 can employ knowledge based or artificial intelligent systems (e.g., Bayesian networks, classifiers, neural networks, decision trees or graphs, fuzzy logic, expert systems, vector machines, Hidden Markov Models, regression, probabilistic/statistical analysis . . . ) to perform inferences concerning the susceptibility of workflow containers to execute. In this manner, machine-learning techniques can be utilized to adjust confidence values, for instance, based on previous program or instruction executions. It should be appreciated that these more advanced mechanism for determine when and if a checkpoint component should be generated can be applied alone or in conjunction with more simple means such as producing a checkpoint component after each successful execution of an instruction or set of instructions.

Although, workflow systems can be used for just about any business or organizational process it is particularly useful in extraction, transformation, and loading of data, for example in conjunction with building a data warehouse. A data warehouse is a facility (e.g., large database(s)) facilitating analysis of data from multiple enterprise systems. To build a data warehouse data has to be read in from older enterprise applications, for instance, a sales tracking application, a customer support application, a user database, and so forth. All this data needs to be read in and stored to the data warehouse. Accordingly, a workflow package 500 or process can be developed to assist in this process. One may think that this consists of two steps, namely reading the data and writing it to the store. However, there are typically a number of constraints that complicate such a task. For instance, there can be a particular time window available for reading or downloading data or the format of the data may have to be converted because it is in some nonstandard format. Hence, real world workflow packages can be quite sophisticated. The present invention as described herein provides a mechanism and means to restart execution of a package 500 in case the package 500 failed from the point it failed or substantially close thereto. This is particularly advantageous as some steps in building a data warehouse may take considerable time such as reading in data from a business' European data center and other steps may fail for some trivial reason that is easily correctable. Without the subject restart mechanism, one would have to start over from the beginning redoing all work such as reloading all the data from the European data center. Furthermore it should be appreciated that this restart mechanism is not trivial at least because there is a lot of state involved that needs to be preserved perfectly so that when the program is run again it can restart from where it stopped.

In view of the exemplary systems described supra, a methodology that may be implemented in accordance with the present invention will be better appreciated with reference to the flow charts of FIGS. 9-14. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
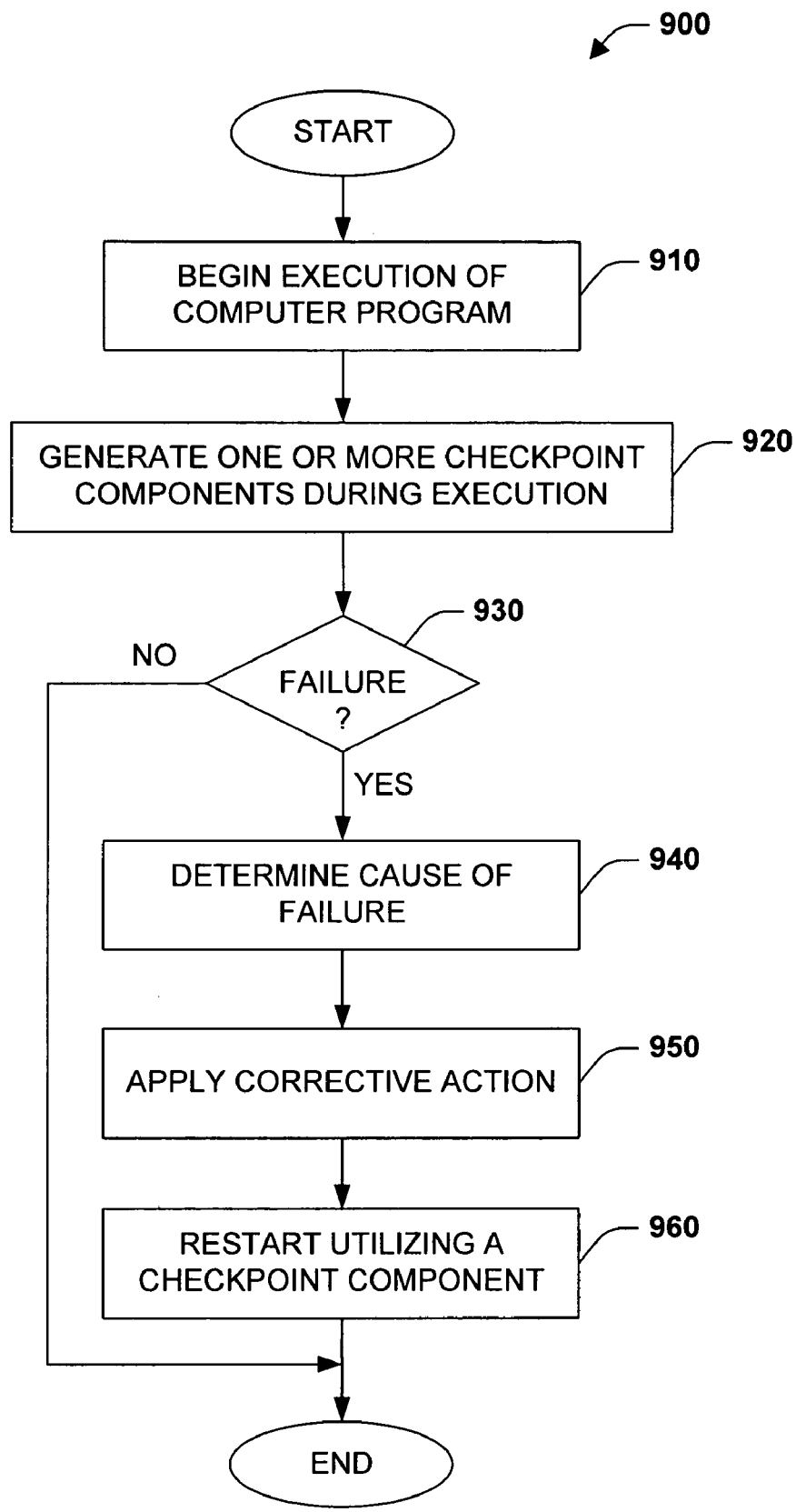
FIG. 9 is a flow chart diagram of a program restart methodology in accordance with an aspect of the subject invention.

Turning to FIG. 9, a program restart methodology 900 is depicted in accordance with an aspect of the subject invention. At 910, computer program execution is commenced. This involves retrieving instructions or execution units from the program and executing the commands specified thereby in the order specified. During this process, program structures (e.g., variables, objects) can be continually constructed, deconstructed, updated or otherwise modified. At 920, one or more checkpoint components can be generated during program execution. Checkpoint components capture program completion data or execution status as well as program state at the time of their creation. Execution status can include, among other things, data concerning the last executed instruction or all successfully executed instructions. Program state pertains to the state of all data structures including but not limited to variables and objects (e.g., arrays, records, tables . . . ). Checkpoint components can be generated after every successfully executed instruction or set of instructions, or based on some more advanced determinations of the likelihood of future failure. At 930, a determination is made as to whether a failure occurred. A failure can occur due to a hard, soft, or logic error, inter alia. If there is no failure during the execution of the program then the process can simply terminate. If, however, a failure occurs then the method can proceed to 940. At 940, the cause of the failure is determined. For example, an attempt may be made to write data to an unavailable or already populated data structure. At 950, corrective action can be performed either automatically by a correction component or via user intervention upon notification of the problem. In the previous example, the table may be cleared or created. Program execution can subsequently be restarted, at 960, utilizing a checkpoint component. For example, the last saved checkpoint component can be retrieved from a nonvolatile memory device. Program state can then be restored in accordance with the checkpoint component state data, and execution can proceed with the instruction following the last successfully executed instruction as indicated by the checkpoint execution status.

Figure 10:
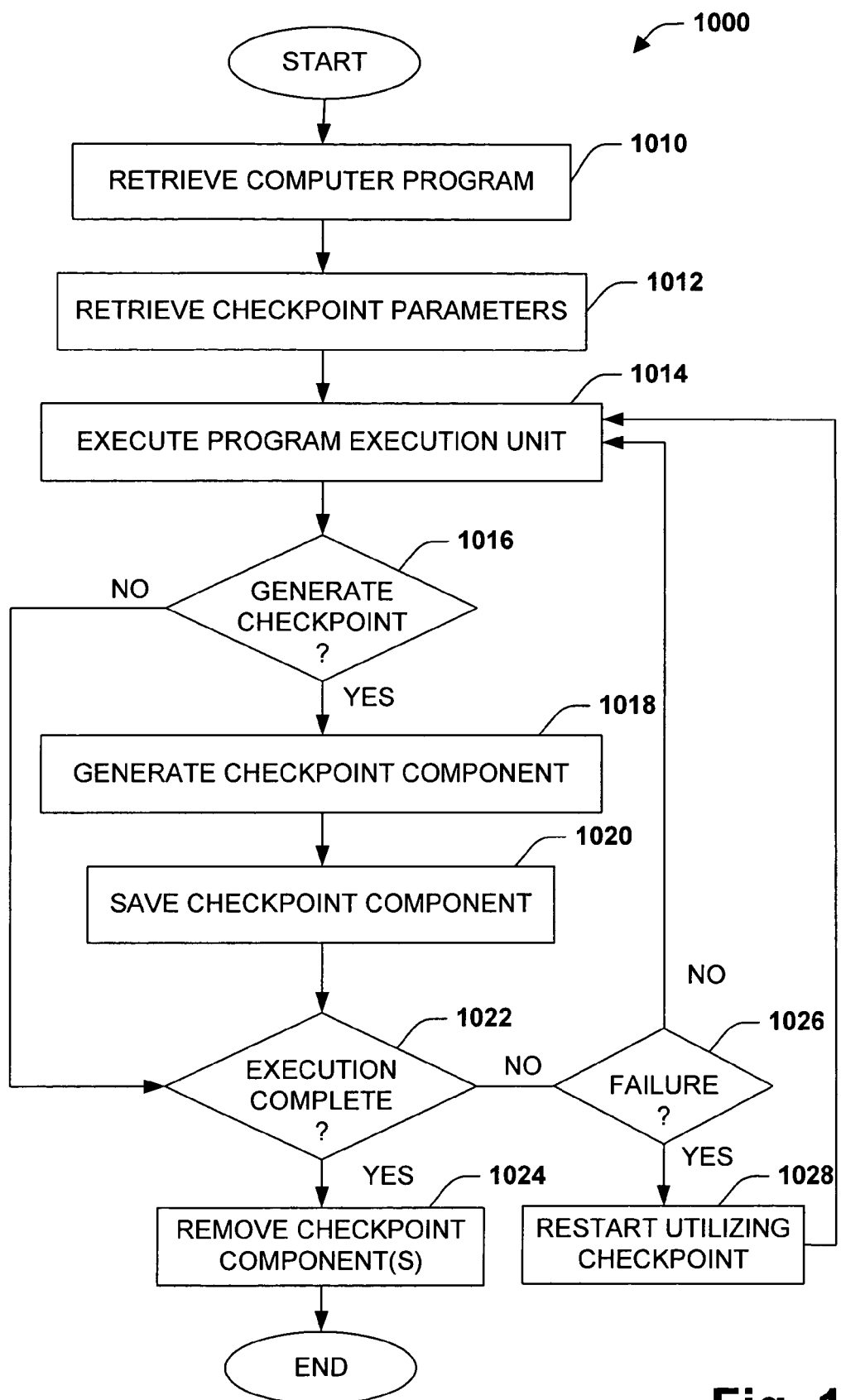
FIG. 10 is a flow chart diagram of a method of checkpoint component generation in accordance with an aspect of the invention.

FIG. 10 depicts a checkpoint generation method 1000 in accordance with an aspect of the present invention. At 1010, a computer program is retrieved for execution. Checkpoint parameters or instructions are retrieved at 1012. Checkpoint parameters or instructions specify actions to be taken or not to be taken with respect to checkpoint components. For instance, checkpoint parameters can specify whether or not checkpoint components are to be generated, when they are to be generated, where they are to be stored if generated, and the mode of usage on start-up (e.g., always, never, if exists . . . ). Checkpoint parameters or instructions can be retrieved from any location. According to one aspect of the subject invention, these parameters can be provided by the program to be executed. At 1014, a program execution unit (e.g., instruction, set or group of instructions, task, container . . . ) is executed. At 1016, a determination is made as to whether a checkpoint component should be generated. This determination can be made in a variety of manners. For instance, the checkpoint parameters can be analyzed to establish whether checkpoints are desired for this particular program. Additionally, if desired, checkpoints can be generated at different times. Checkpoints can be generated for each execution unit or more sporadically based, for instance, on the likelihood of failure. If a checkpoint is not to be generated at 116, then the method continues at 1022 where a decision is made concerning whether all the program units have been executed. If yes, then all generated checkpoint components are removed at 1024. If not, a determination is made as to whether a failure has occurred, at 1026. If a failure has occurred, then the program is terminated and restarted utilizing a checkpoint component, at 1028. Restart would consist of loading the program state and identifying the execution unit that will be executed. Thereafter, the unit is executed at 1014. If a failure has not occurred then the method can simply continue by executing the next execution unit. If it is decided, at 1016, that a checkpoint is to be generated, then a checkpoint component is generated, at 1050. Generation of a checkpoint component can include capturing the current execution status, for instance the last successful execution unit. Additionally, the checkpoint component can include the program state (e.g., variable, object values . . . ). At 1060, the checkpoint component can be stored to non-volatile memory so that it will be available for retrieval if the associated program fails or crashes. The location of this checkpoint component can be dictated by parameters or instructions provided by the program itself, for instance. At 1022, it is determined whether the program execution has been completed. If it has not completed, then the process continues at 1026 where a determination is made as to whether a failure has occurred, as previously described. Otherwise, the method proceeds to 1024 where any stored checkpoint component(s) are removed. According to one aspect of the invention, the presence of a checkpoint component can indicate to an execution engine that the program is being restarted or is restart or checkpoint mode. Thus, checkpoint component(s) are removed to indicate complete execution of the program.

Figure 11:
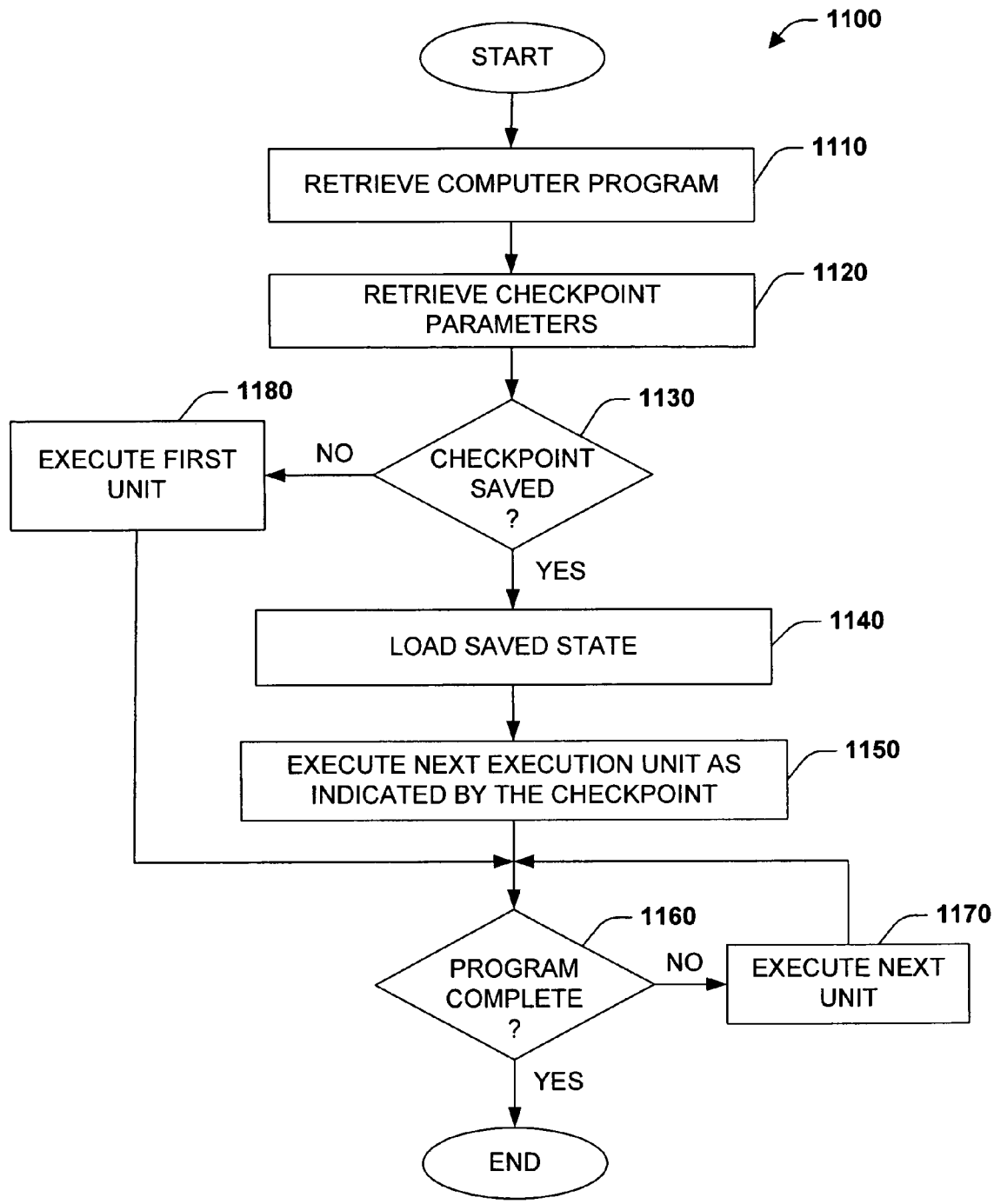
FIG. 11 is a method of starting program execution in accordance with an aspect of the subject invention.

FIG. 11 depicts a method of starting program execution 1100 in accordance with an aspect of the invention. At 1110, a computer program is retrieved or designated for execution. At 1120, checkpoint component parameters, properties and/or instructions are retrieved from the program. Among other things, these parameters can designate the location of any stored checkpoint components. At 1130, a check is made to determine if there is a checkpoint has been stored utilizing data provided by the parameters, for instance. If a checkpoint has not been stored, then, at 1180, the program can start execution from the first instruction or execution unit. If a checkpoint component is located at 1130, then program state can be loaded from the checkpoint component, at 1140. At 1150, the next execution unit can be executed as indicated by the checkpoint component. At 1160, a check is made as to whether the program has completed. If it has completed, then the method can simply terminate. If program has not completed, then the next sequential execution unit can be executed at 1170. A loop is then entered where the execution units are executed and a check is made to determine when the program has completed. When it completes, the method simply terminates. It should be appreciated, however, that although not depicted in this figure, checkpoint components can be generated at times during unit execution as discussed throughout this detailed description.

Figure 12:
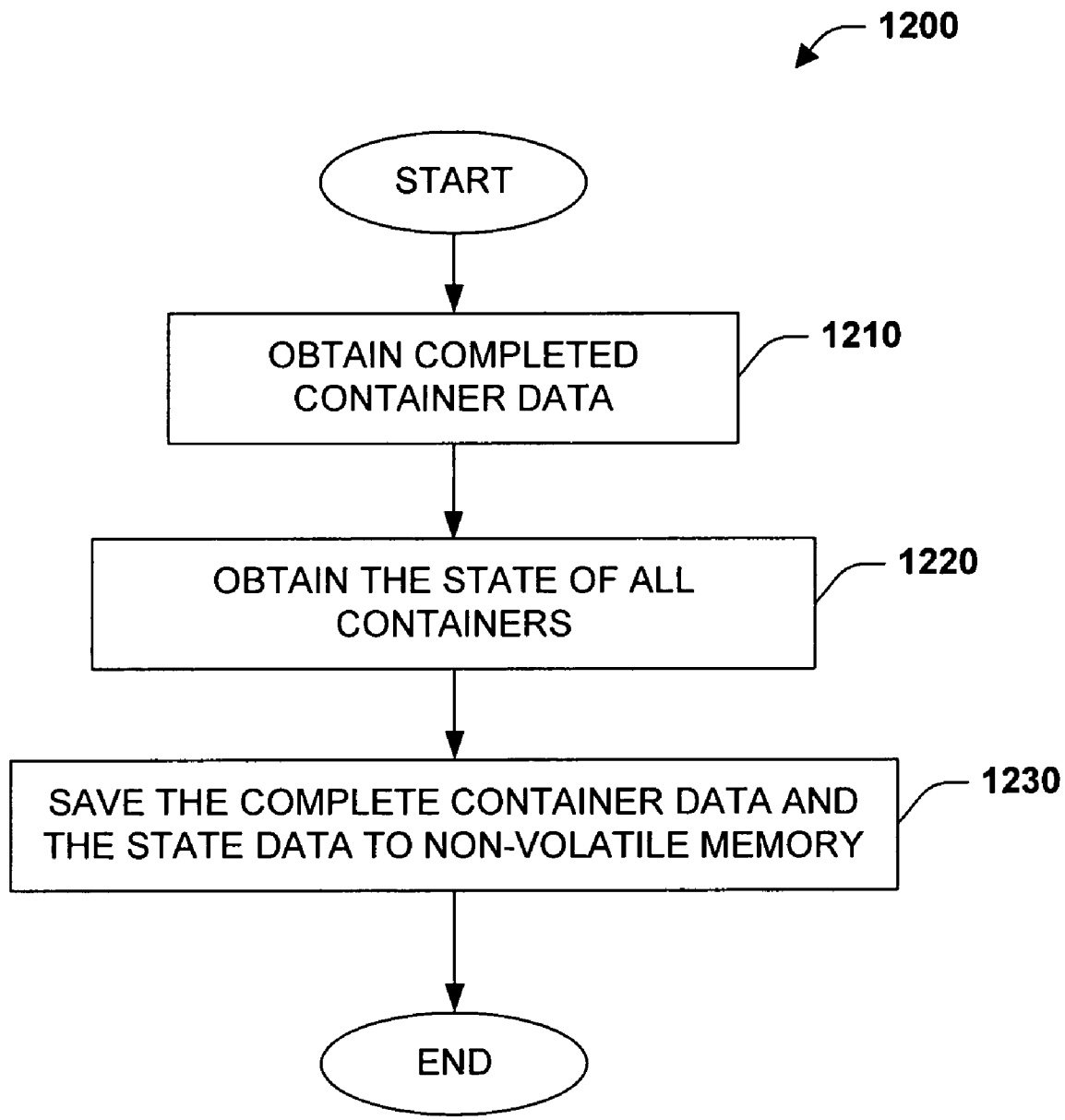
FIG. 12 is a flow chart diagram of a method of checkpoint component generation for a workflow system in accordance with an aspect of the subject invention.

FIG. 12 illustrates a method 1200 of generating a checkpoint component for a workflow system. At 1210, complete container data is obtained. Completed container data includes specification of all completed containers (whether successful or not), execution result (e.g., successful or unsuccessful) as well as a precedent constraint value(s). According to an aspect of the invention, the precedent constraint values are provided in bit maps. At 1220, all container states or state data is obtained. Container state can be provided via variables associated with containers, among other things. Container state can thus be represented by a container ID, a variable ID, and a variable value. Finally, at 1240, the completed container data and state data for all containers are stored in non-volatile memory. The invention contemplates storage of the checkpoint component in any format. However, in accordance with various aspects of the invention, the checkpoint component can be a record and the complete container data can be stored as a list.

Figure 13:
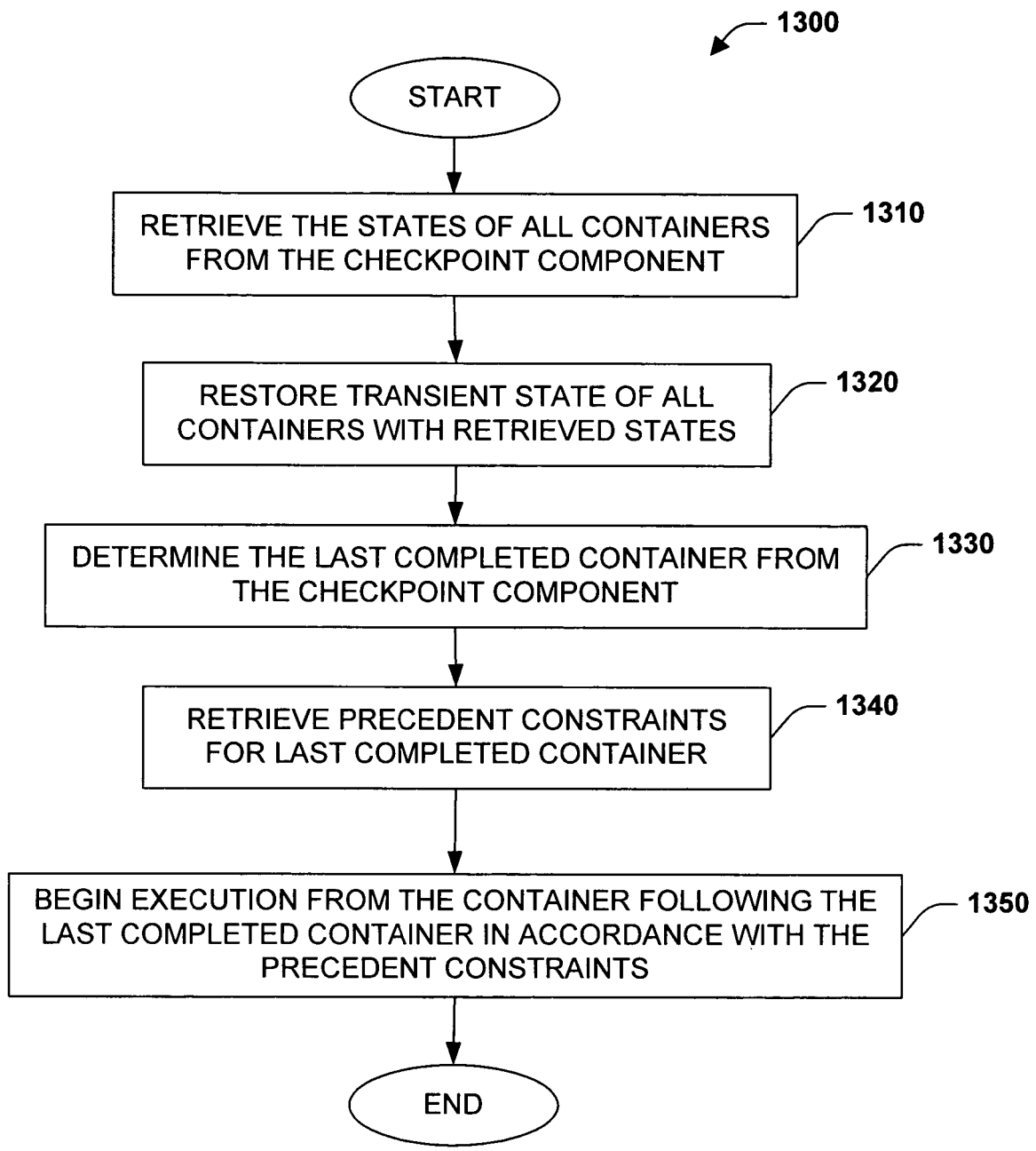
FIG. 13 is a flow chart diagram of a restart method for a workflow system in accordance with an aspect of the subject invention.

FIG. 13 depicts a flow chart diagram of a restart method 1300 for a workflow system in accordance with an aspect of the subject invention. At 1310, the states for all containers are retrieved from the checkpoint component. The checkpoint can be stored as a record, for instance, which can be retrieved from a non-volatile memory device. The transient state can be retrieved by specifying container and variable IDs. At 1320, the transient state of all containers is restored, for example, updating the variable values to be consistent with those retrieved from the checkpoint component. At 1330, the last container completed is determined from checkpoint component data. As used herein, a container can include one or more tasks or steps, and zero or more sub containers. The precedent constraint value(s) are retrieved for the last completed component, at 1340. Finally, at 1350, execution (restart) begins with the container following the last completed container in accordance with retrieved precedent constraints.

Figure 14:
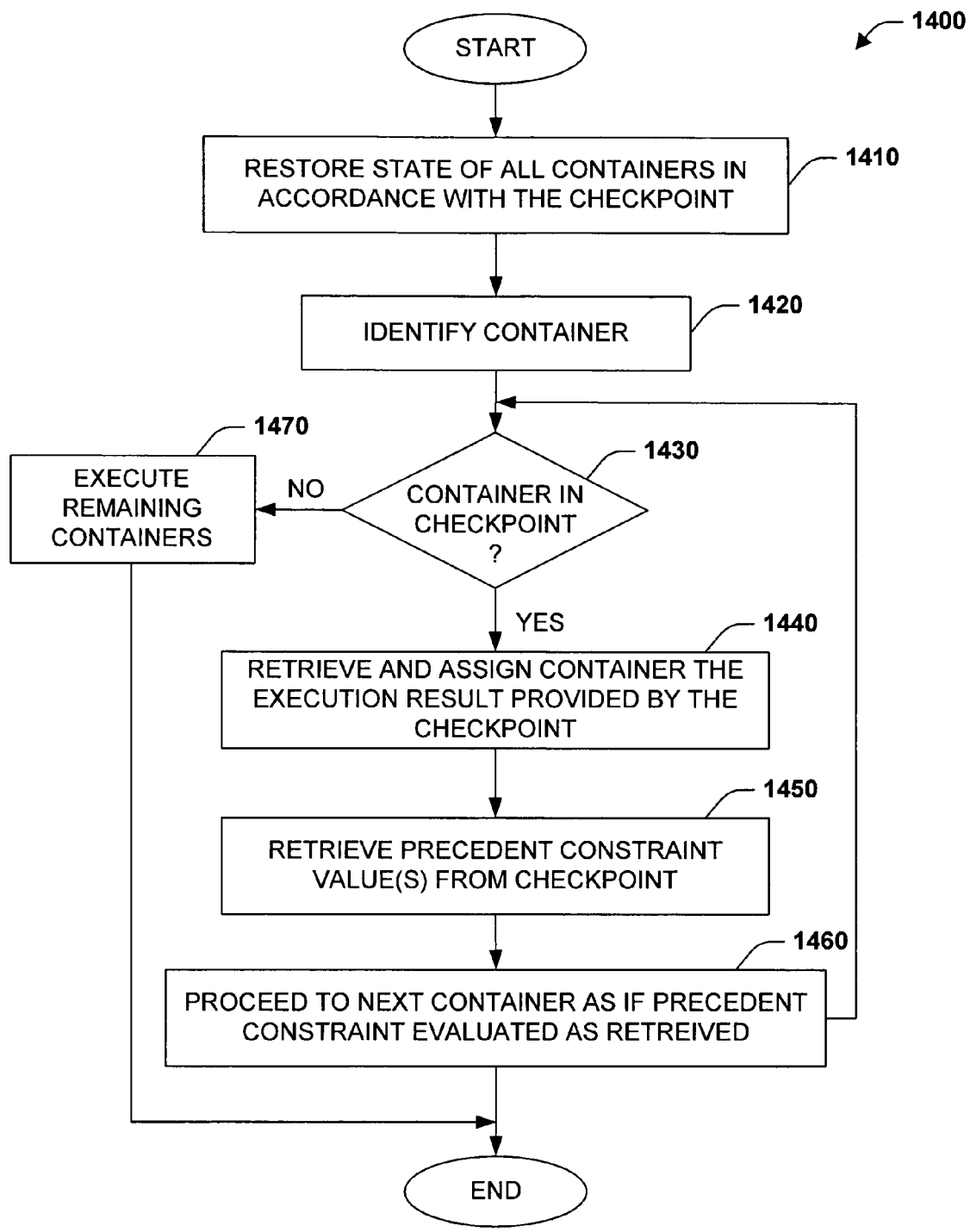
FIG. 14 is a flow chart diagram of a restart method for a workflow system in accordance with an aspect of the subject invention.

FIG. 14 illustrates a restart method 1400 for a workflow system in accordance with an aspect of the subject invention. At 1410, the state of all containers is restored with the data provided by the checkpoint component. This can be accomplished by updating the values associated with containers with the values provided in the checkpoint by specifying the container and variable IDs. At 1420, the first container in a package is identified. At 1430, a check is made to determine if the container is referenced as a completed container in the checkpoint component. If yes, then at 1440 the execution result is retrieved from the checkpoint component and assigned to the container. At 1450, the precedent constraint value(s) are retrieved from the checkpoint component. At 1460, the next container is identified as if the precedent constraint value(s) had be evaluated as retrieved. The method then continues at 1430 where again a determination is made as to whether the container is identified as a completed container in the checkpoint component. If the container is not identified as complete then, at 1470, that container and subsequent containers are executed. Once a container is identified that is not listed as complete, this indicates that execution has advanced beyond the point captured by the checkpoint component. Thus, the containers thereafter should be executed, as they were not previously completed due to a failure.

Figure 15:
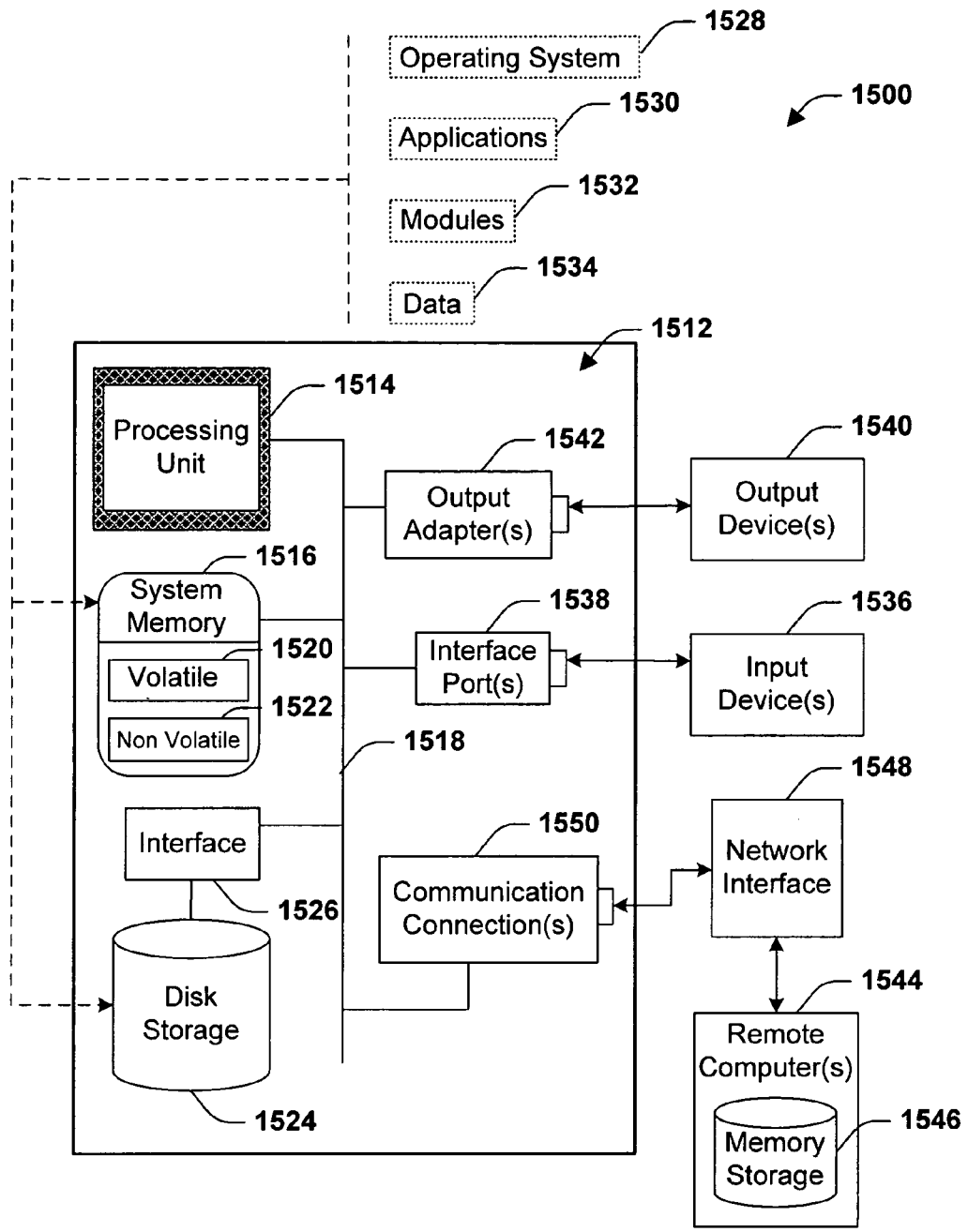
FIG. 15 is a schematic block diagram illustrating a suitable operating environment in accordance with an aspect of the present invention.
Figure 16:
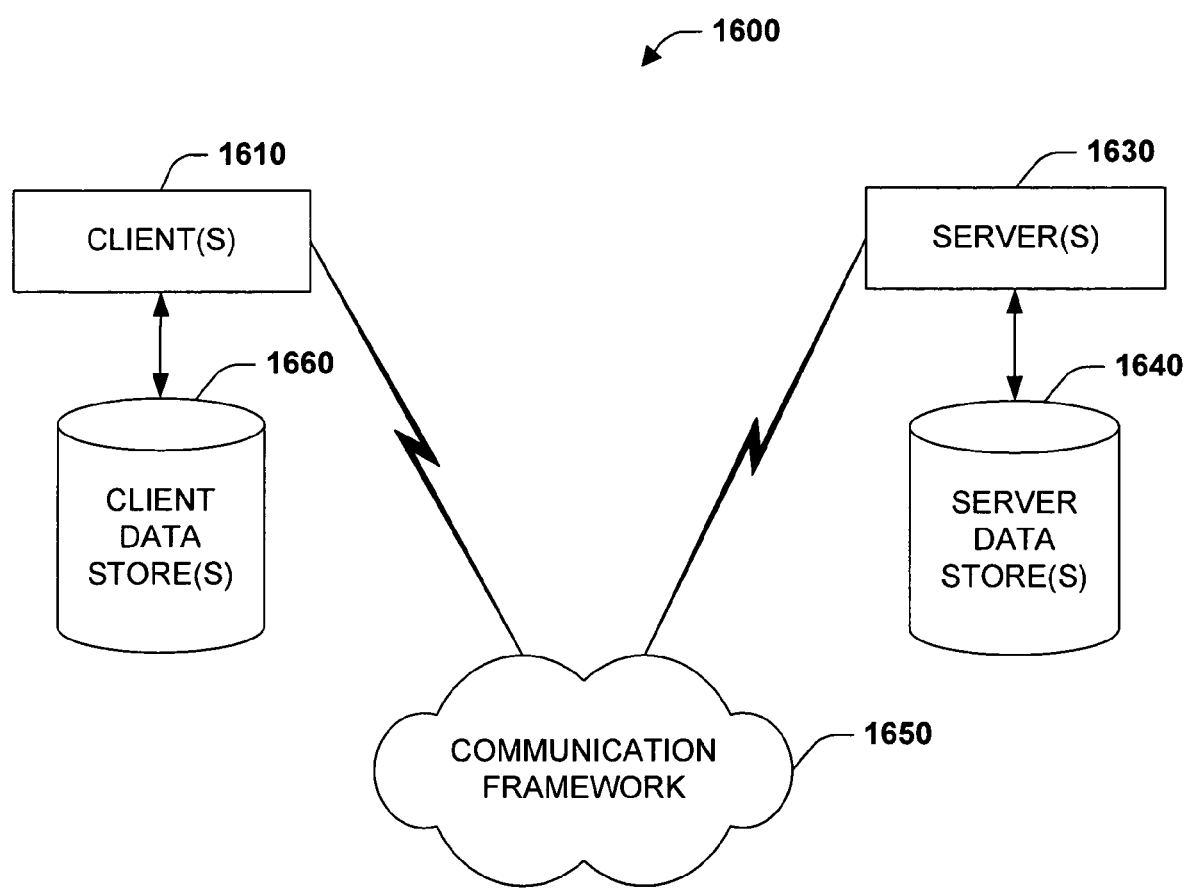
FIG. 16 is a schematic block diagram of a sample-computing environment with which the present invention can interact.

In order to provide a context for the various aspects of the invention, FIGS. 15 and 16 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 15, an exemplary environment 1510 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example disk storage 1524. Disk storage 4124 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512 and to output information from computer 1512 to an output device 1540. Output adapter 1542 is provided to illustrate that there are some output devices 1540 like displays (e.g., flat panel and CRT), speakers, and printers, among other output devices 1540, that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems, power modems and DSL modems, ISDN adapters, and Ethernet cards.

FIG. 16 is a schematic block diagram of a sample-computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the present invention, for example. One possible communication between a client 1610 and a server 1630 may be in the form of a data packet adapted to be transmitted between two or more computer processes. The system 1600 includes a communication framework 1650 that can be employed to facilitate communications between the client(s) 1610 and the server(s) 1630. The client(s) 1610 are operatively connected to one or more client data store(s) 1660 that can be employed to store information local to the client(s) 1610. Similarly, the server(s) 1630 are operatively connected to one or more server data store(s) 1640 that can be employed to store information local to the servers 1630.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A workflow error recovery system comprising:
a processor configured to execute components of the workflow error recovery system;
a system memory;
a receiver component to receive a workflow package;
an execution component that executes the workflow package and generates checkpoint data during execution which is used to restart program execution at a point captured by the data upon failure, and wherein parameters as to how the checkpoint data is handled and if and when a checkpoint component is used during restart is received by the receiver component;
a monitor component that monitors the program execution;
a checkpoint generation component that generates one or more checkpoint components, the checkpoint generation component cooperates with the monitor component such that the checkpoint components are generated during and based on the program execution; and
an intelligent assist component that infers and predicts possible sources of execution failures and, analyzes program instructions to provide a value indicative of a degree of confidence that a particular instruction or set of instructions will succeed or fail; and
wherein the checkpoint generation component receives a confidence value from the intelligent assist component, compares the value to a threshold, and determines whether or not to generate the checkpoint component prior to execution of an instruction, and wherein machine-learning techniques are utilized to adjust the confidence values based on the program execution.

2. The system of claim 1, wherein the checkpoint data includes completed container data and state data.

3. The system of claim 2, wherein the completed container data identifies a completed container and includes its execution status, and precedent constraint values.

4. The system of claim 2, wherein the state data stores the values of variables associated with one or more containers.

5. The system of claim 1, wherein the checkpoint data is stored on a nonvolatile memory device.

6. The system of claim 1, wherein the execution component restores package state and determines the point to restart execution from the checkpoint data.

7. The system of claim 1, wherein the execution component retrieves parameters from the workflow package that control aspects of checkpoint generation and use upon restart.

8. The system of claim 7, wherein the parameters specify at least one of where the checkpoint data is to be stored and whether the checkpoint data should be employed during restart.

9. The system of claim 1, wherein the execution component deletes the checkpoint data upon completing execution of the workflow package.

10. At a computer system including a processor and system memory, a single program failure recover methodology comprising:
executing a computer program using at least one of the processor and the system memory;
generating one or more checkpoint components including program completion data and state data during execution;
saving the one or more checkpoint components to nonvolatile memory;
inferring and predicting possible sources of execution failures;
analyzing program instructions and providing a value indicative of a degree of confidence that a particular instruction or set of instructions will succeed or fail;
receiving a confidence value and comparing the value to a threshold, and based on that comparison determining whether or not to generate a checkpoint component prior to execution of an instruction; and
utilizing machine-learning techniques to adjust the confidence values based on execution.

11. The method of claim 10, further comprising restarting the program utilizing one of the checkpoint components upon execution failure.

12. The method of claim 11, wherein a checkpoint component is generated after successful execution or completion of a program instruction or instruction set.

13. The method of claim 11, wherein a checkpoint component is generated prior to program instruction execution when a likelihood of instruction or instruction set failure is greater than a threshold.

14. The method of claim 11, wherein restarting the program comprises utilizing the most recently saved checkpoint component prior to failure.

15. The method of claim 10, further comprising retrieving parameters or instructions providing information regarding employment of checkpoint components from the computer program.

16. The method of claim 10, wherein the checkpoint components are deleted upon complete execution of the program.

17. A computer readable storage medium having stored thereon computer executable instructions for carrying out the method of claim 10.

18. At a computing system comprising a processor and system memory, a method of checkpoint component generation for a workflow package comprising:
- identifying, using at least one of the processor and the system memory, completed containers, associated execution results and precedent constraint values;
- obtaining the state of all containers;
- storing identities of the completed containers, execution results, precedent constraint values and the state of all containers to non-volatile memory;
- associating checkpoint parameters, properties, and instructions with the completed containers;
- generating one or more checkpoint components during and based on program execution;
- determining when and if the one or more checkpoint components should be used during restart;
- inferring and predicting possible sources of execution failures;
- analyzing program instructions and providing a value indicative of a degree of confidence that a particular instruction or set of instructions will succeed or fail;
- receiving a confidence value and comparing the value to a threshold, and based on that comparison determining whether or not to generate a checkpoint component prior to execution of an instruction; and
- utilizing machine-learning techniques to adjust the confidence values based on the program execution.

19. The method of claim 18, further comprising generating a list of completed containers including container ID, execution result, and precedent constraint values and storing the list to non-volatile memory.

20. The method of claim 18, wherein state is provided in at least one variable associated with a container and obtaining the state comprises determining a container ID, variable ID, and variable value.

* * * * *